United States Patent [19]
Kulesza et al.

[11] 4,136,206
[45] Jan. 23, 1979

[54] METHOD OF OBTAINING A SMOKING AGENT

[75] Inventors: Janusz Kulesza; Kazimierz Miler, both of Warsaw; Jerzy Podlejski; Józef Góra, both of Lódz; Teresa Czajkowska; Zbigniew Kozlowski, both of Warsaw; Jadwiga Kolska, Kolo; Jolanta Stolowska, Lodz; Zygmunt Rutkowski, Warsaw, all of Poland

[73] Assignee: Politechnika Lodzka, Instytut Brzemyuslu Miesnego, Warsaw, Poland

[21] Appl. No.: 782,303

[22] Filed: Mar. 28, 1977

Related U.S. Application Data

[63] Continuation of Ser. No. 551,416, Feb. 20, 1975, abandoned.

[30] Foreign Application Priority Data

Feb. 22, 1974 [PL] Poland .................................. 169004

[51] Int. Cl.² .............................................. A23L 1/232
[52] U.S. Cl. ..................................... 426/431; 426/533; 426/650; 426/652
[58] Field of Search ............... 426/314, 315, 533, 650, 426/651, 429, 431, 422, 424, 652

[56] References Cited

U.S. PATENT DOCUMENTS

| Re. 27,670 | 6/1973 | Miler et al. ........................ 426/533 |
| 3,106,473 | 10/1963 | Hollenbeck ........................ 426/650 |
| 3,152,914 | 10/1964 | Taylor .............................. 426/650 X |
| 3,445,248 | 5/1969 | Miler et al. ........................ 426/533 |
| 3,615,729 | 10/1971 | Baker et al. ...................... 426/650 X |
| 3,873,741 | 3/1975 | Meller et al. ...................... 426/650 |
| 3,875,314 | 4/1975 | Wistrgich et al. .............. 426/650 X |
| 3,903,267 | 9/1975 | Miler et al. ......................... 424/195 |

Primary Examiner—Robert A. Yoncoskie
Attorney, Agent, or Firm—Haseltine, Lake & Waters

[57] ABSTRACT

A method for obtaining a smoking agent from smoke condensate obtained from the destructive distillation of cellulose or lignin material comprising subjecting the smoke condensate to extraction by an aqueous solution of a mineral acid to remove organic bases or with a mineral acid which does not decompose at temperatures up to 250° C, in order to bind the bases. The product is then subjected to distillation under reduced pressure in an atmosphere of an inert gas with the addition of metallic dusts and in a second stage of distillation with the addition of a polyhydric alcohol. The obtained smoking agent from the distillation can be subjected to selective absorption of ballast or undesirable substances by passage through suitable adsorbents. In a modification the two stage distillation preceeds the extraction and in a further modification the active substances are first extracted with an organic solvent and then subjected to distillation under reduced pressure.

37 Claims, No Drawings

METHOD OF OBTAINING A SMOKING AGENT

CROSS-RELATED APPLICATION

This Application is a continuation of co-pending Application Ser. No. 551,416 filed Feb. 20, 1975 now abandoned.

FIELD OF THE INVENTION

This invention relates to a method of obtaining a smoking agent of aromatizing and preserving properties which agent when added to protein-fat articles of food improves their taste and smell properties, imparts to them features of smoked products, increases their permanence and counteracts oxidation.

BACKGROUND

It is known to impart to protein — fat produces the characteristics of smoked flavor by direct subjection of said products to the action of curing smoke obtained as a result of uncompleted combustion of cellulose-lignin material. The draft method imparts to products indeed the expected taste and smell of smoked flavor but at the same time it contaminates them with superfluous and harmful components to which belong first of all nitric bases and certain volatile acids imparting a foreign smell to the products being treated, as well as carcinogenic hydrocarbons, benzopyrene and benzophenathrene derivatives.

Furthermore, the smoking by means of curing smoke on a large commercial scale is a technologically onerous process, difficult to standarize and automate for continuous production lines requiring expensive devices and great stores of definite wood material indispensable for the preparation of smoke.

The above disadvantages and inconveniences are the reason why the draft method of smoking is gradually being abandoned and replaced by so-called smokeless curing with the aid of smoking agents which when added to articles of food impart to them taste and smell properties more or less similar to that of products smoked according to the classical method but containing neither carcinogenic nor ballast substances.

Smoking agents are obtained from products of destructive distillation of wood or cognate raw-materials which is effected without air access or with air excess. Initially, as the raw materials, distillation water separated components obtained from the dry distillation of wood was mainly utilized; in the course of time distilled tar and smoke products formed during the pyrolysis of wood were used. There exists a series of methods of obtaining smoking agents from these raw-materials by way of distillation, extraction, fractionation or a combination of operations seeking the removal of harmful and undesired components and retaining only compounds or groups of compounds exhibiting suitable taste and smell properties, and antioxidant and bactericidal characteristics.

From smoking agents very high quality requirements are expected, the fulfilment of which is a fundamental condition for the acceptance of said agents by government authorities for their application to articles of food. Furthermore they should impart to articles of food the typical desired taste and smell of smoked products; they should exhibit antioxidant and bactericidal properties, and they are not allowed to comprise carcinogenic compounds in a quantity exceeding 1 part by weight per one million parts by weight of the article of food and they should be used in quantities of from a dozen or so to several hundred parts by weight of the agent per one million parts by weight of the product.

From among known smoking agents only a few of them fulfil the above conditions. Among them are the smoking agent obtained according to U.S. Pat. No. 3,445,248, U.S. Pat. No. Re. 27,670 and U.S. Pat. No. 3,903,267. These agents are obtainable by fractional extraction, with the aid of organic water-immiscible solvents, advantageously ethyl ether, of the condensate of curing smoke obtained in the process of destructive distillation of cellulose and/or lignin material, in air excess.

In the process according to U.S. Pat. No. 3,903,267 three usable fractions are isolated. As the first, the fundamental fraction, the fraction containing mainly phenol compounds of a molecular weight of above 140 is obtained. This fraction may be mixed with the second, the terpene fraction obtained during the further course of the extraction and containing compounds that do not form salt type combinations in a medium of a pH value of about 12.8, and with the third, the acid fraction containing lower carboxylic acids and forming the finished smoking agent. However, this method is technologically rather difficult and labor-consuming, and requires a complicated apparatus.

SUMMARY OF THE INVENTION

The method of obtaining the smoking agent according to the invention makes it possible to produce the agent by a method which is simple both in respect to the technology and the equipment, is easy for automatization and provides safe work conditions. Furthermore, this agent exhibits very good taste and smell properties fully simulating the aroma of smoked food articles. It exhibits also antioxidant and bacteriostatic properties, whereby it is a very good agent for the preservation of protein-fat products and it is free from ballast and unwholesome compounds.

The method of obtaining the smoking agent according to the invention is as follows. In the first technological stage, from the initial raw material constituting tar or smoke condendate, which is also tar, obtained from destructive distillation of cellulose and/or lignin material, which distillation is effected in an oxygen-free atmosphere or in a oxygen atmosphere, a part of the ballast compounds, particularly organic nitric bases are removed. These compounds are removed either by extraction with diluted mineral acids, advantageously with sulphuric acid, or by binding them with acid at a temperature up to 250° C., advantageously with ortho-phosphoric acid, which simultaneously prevents condensation-polymerization processes and in such a case they will remain up to the end of the process in the tails constituting the waste. An aqueous solution of mineral acid with a concentration of 5-20%, in a quantity of 5-25% by weight in relation to the weight of the tar or smoke condensate, is used for the extraction.

The extraction is effected once or several times with portions of acid at room temperature, whereupon the upper layer containing the organic nitric bases and constituting the waste, is separated, whereas the lower tarry layer is washed several times with water and with an aqueous solution of sodium bicarbonate or with a saturated aqueous solution of sodium chloride, whereupon it is subjected to further operation. On the other hand, the binding of organic nitric bases with orthophosphoric acid is made by mixing the initial raw material with 0.5–5% by weight of 85–90% acid. The raw material thus preliminarily purified is subjected to a two-stage distillation under reduced pressure in an atmosphere of inert gas, e.g. nitrogen, argon or carbon dioxide, advantageously with an addition of 1–10% by weight, preferably 5%, of zinc, aluminium or iron dust. The application of dust allows obtaining a smoking agent of a light, amber color, because it prevents the oxidation of the hydroquinone or quinone system. Said dust may be added in the first or in the second distillation phase.

In the first distillation phase effected at a pressure of 30–20 mm Hg we collect as the waste, the fraction containing substances exhibiting a boiling point of below 110–100° C. These are mainly low-molecular organic acids, water, hydrocarbons and other ballast substances.

In the second phase of the distillation process we lower the pressure to a value not higher one than 20 mm Hg and we collect the fraction containing compounds of a boiling point of up to 250° C. at 20 mm Hg. When using a pressure which is lower than 20 mm Hg, compounds of a correspondingly lower boiling point are distilled. This fraction is the finished smoking agent.

The tails from the above distillation containing mainly pitch, and acid e.g. phosphoric acid when used, also bound organic nitric bases are technological waste. It has been found that it is much easier to remove the waste tails from the distilling apparatus if they are diluted by means of polyhydric alcohol. It is therefore of advantage to effect the second phase of the distillation process at a pressure of up to 20 mm Hg as an extractive distillation with polyhydric alcohol vapors, which alcohol also influences in a positive manner the distillation process itself, the polyhydric alcohol advantageously being glycerol.

Polyhydric alcohol is mixed with tar removed from the fraction of boiling point of below 100° C. at a pressure from 20 mm Hg, as well as of organic nitric bases, or having nitric bases bound with the aid of acid, in a quantity of 1–10 parts by weight of alcohol per 1 part by weight of raw material, advantageously 5 parts of alcohol per 1 part of raw material. From this process we collect the fraction exhibiting a boiling point of up to 250° C. at 20 mm Hg, or of a correspondingly lower temperature at a pressure of below 20 mm Hg. This fraction constituting a mixture of polyhydric alcohol and compounds which is the smoking agent, is then heated to a temperature of 50–90° C. in order to obtain automatic separation into two layers. The upper layer is the smoking agent, while the lower layer is the polyhydric alcohol which can be re-used for the distillation of the next portion of tar.

Research has shown that positive results are obtainable with a certain modification of the method of obtaining the smoking agent according to the invention. This modification consists in that the sequence of the operations is changed in such a way that the raw distillation tar or the smoke condensate is first subjected to the two-stage distillation according to the process above described while maintaining the same technological parameters, and only in the final distillate containing the smoking agent do we remove the organic nitric bases by extraction with the aid of the aqueous solution of a mineral acid, advantageously sulphuric acid.

The smoking agent obtained according to the invention is a complicated mixture of organic compounds which contains at least 50% of components of phenol character, as well as higher fatty acids terpene compounds and others, said agent being simultaneously freed of substances of carcinogenic action. This agent distinguishes itself by the typical desired smoked food aroma and when added to protein-fat products it imparts to them characteristics of products smoked according to the draft method and increases their permanence and counteracts their oxidation. The yield of the process according to the invention calculated on the basis of the initial raw material, amounts of 15–40% by weight.

The method of the present invention may also be used for refining the fractions obtained according to U.S. Pat. No. 3,903,267, especially the fraction containing phenols of a molecular weight above 140, in order to improve both their taste and smell properties, and the degree of purity, especially as regards decreasing a minimum, the contents of noxious substances.

Particularly satisfactory quantitative and qualitative results were obtained by subjecting the above phenol fraction to additional technological treating consisting in distilling under reduced pressure, advantageously in the presence of an non-decomposable acid at a temperature of up to 250° C., especially orthophosphoric acid, added for binding the substances of organic base character and for counteracting the polymerization condensation processes, and/or in the presence of zinc or aluminium dust to prevent the oxidation.

The distillation process is conducted at a pressure not higher than 20 mm Hg at a temperature of up to 200° C. or a correspondingly lower one at a pressure lower than 20 mm Hg, the acid being added in a quantity of up to 5% by weight, whereas the zinc or aluminium dust is present in a quantity of 1–5% by weight in relation to the phenol fraction. Additional assurance against the possibility of oxidation and an improvement of the conditions of the run of the process can be obtained by conducting the distillation in an oxygen-free atmosphere. Considerable facilitation of the distillation conditions can be obtained by adding, prior to the beginning of the distillation, to the phenol fraction, polyhydric alcohol, advantageously glycerol in a quantity of 3–6 parts by weight of alcohol per one part by weight of the phenol fraction. The yield of the phenol fraction refined according to the distillation method amounts to 60–90% by weight in relation to the weight of the raw anhydrous fraction.

The obtained distillate after its separation from alcohol is in the form of a thick yellowish oil and is characterized by high taste and smell values and contains only traces of ballast compounds noxious to health, particularly carcinogenic ones. Instead of polyhydric alcohols as the additional substances in the distillation process, it is possible to use vegetable oils, high-boiling aliphatic hydrocarbons or silicon oils which during the distillation do not pass to the distillate. In the case of conducting the distillation in a non-acid medium, e.g. in the presence of a polyhydric alcohol or oil, it is of advantage to subject the raw or distilled phenol fraction to extraction with the aid of a mineral acid such as sulphuric acid, in order to remove substances of organic base character, and then wash for neutralization purposes. It has been found that both in technical and economical regards the most effective procedure is to conduct the distillation process according to the continuous method.

An identical refining operation by distilling under reduced pressure can be employed for the third fraction of the smoking agent according to U.S. Pat. No. 3,903,267, which fraction contains lower carboxylic acids.

For increasing the effect of removing, from the smoking agent, the ballast and noxious compounds of the benzopiren type, dibenzoatracen and other aromatic hydrocarbons, it is subjected to the operation of selective adsorption on adsorption masses such as: active carbon, porous silica gel, synthetic molecular sorbents etc. The process is effected in such a manner that the smoking agent is previously diluted in organic solvents such as: lower aliphatic alcohols, dialkyl ethers, halogen hydrocarbons and the like, or non-diluted it is heated to a temperature of 50–90° C., and then it is passed through a column filled with a convenient adsorbent. For 100 parts by weight of the agent, 10–50 parts by weight of absorption mass are used, subject to its kind and selection activity. After the fluid has passed through a the adsorption column, the solvent is, in case of need, removed by evaporation under normal or reduced pressure. A refined smoking agent in the form of a thick yellowish oil of intensive smoked food aroma and of a very high degree of purity, especially as regards carcinogenic compounds, is obtained.

As a result of the process of obtaining a smoking agent according to the invention one obtains a product not only of very high purity, but also of excellent aromatizing and antioxidizing properties. This agent is a concentrate of very high concentration. Being used with food products in quantities from several parts to several hundred parts by weight per one million parts by weight of the product, it is necessary to dilute said concentrate with the aid of suitable carrier substances, such as: ethyl alcohol, ethylene glycol, glycerol, animal fats or vegetable fats, domestic salt, starch, spices, pickling mixtures, water etc. Said dilution takes place, depending on the kind of the carrier, either by dissolving the concentrate in the carrier or by saturating the solid carrier with the concentrate or by producing an emulsion of the concentrate in the carrier. The smoking agent is diluted to a concentration of several percent. The agent diluted in the carrier is mixed with the food product according to known methods. For instance, a several percent solution or the emulsion of the smoking agent in a carrier of low viscosity with the addition of a dye or without said addition is sprayed on the surface of the food product, advantageously using an electrostatic field, whereupon the evaporation of the carrier takes place automatically.

DESCRIPTION OF PREFERRED EMBODIMENTS

The method of obtaining the smoking agent according to the invention is more fully explained by the following examples:

EXAMPLE I

Tar from dry distillation of hardwood is subjected at room temperature to extraction by means of a 10% aqueous sulphuric acid solution used in a quantity of 10% by weight in relation to the weight of the initial tar. The separated upper water layer containing organic nitric bases unfavorably influencing the aroma of the smoking agent, is rejected as waste, whereas the tarry layer is washed 4 times with water and with a 3% sodium bicarbonate solution to neutral reaction. The preliminarily purified tar is then subjected to fractional distillation in a nitrogen atmosphere after 5% weight of zinc dust, calculated in relation to the tar, has previously been added. The distillation is conducted under reduced pressure in two stages. First the fraction of compounds exhibiting a boiling point of less than 100° C. at 20 mm Hg, being a mixture of low molecular fatty acids and phenols as well as hydrocarbons negatively influencing the aroma of the smoking agent, and which is a waste, is collected. Then the pressure is lowered up to 10 mm Hg and the fraction exhibiting a boiling point of less than 180° C. at 10 mm Hg, consttituting the smoking agent, is collected. The yield of the smoking agent thus obtained amounts to 30% in relation to the initial tar.

EXAMPLE II

Tar which is the condensate of curing smoke obtained by destructive wood distillation conducted with air excess, liberated from nitric bases and compounds exhibiting a boiling point of less than 100° C. at a pressure of 20 mm Hg as in Example I, is mixed with four times the quantity of glycerol and subjected to extractive distillation in nitrogen atmosphere under a pressure not exceeding 20 mm Hg. A fraction exhibiting a boilingpoint of up to 250° C. at 20 mm Hg is collected. The distilled mixture of glycerol and compounds constituting the smoking agent is heated to 60° C. in order to separate into two layers. The lower layer is glycerol, whereas the upper layer is pure smoking agent. The yield of the process amounts to 20% in relation to the quantity of the initial raw material.

EXAMPLE III

To tar originating from destructive distillation of wood, 2% by weight of 85% orthophosphoric acid is added and the mixture is subjected to a two-stage distillation in carbon dioxide atmosphere under reduced pressure. The forerunnings containing compounds exhibiting a boiling point of less than 110° C. at a pressure of 25 mm Hg are collected. These forerunnings constitute a mixture of low-molecular fatty acids, phenols and hydrocarbons and is rejected as waste. After distilling off the forerunnings, 5% by weight of aluminium dust is added to the residue and in a carbon dioxide atmosphere the smoking agent exhibiting a boiling point of up to 250° C. at 20 mm Hg is distilled off. The yield of the smoking agent is the same as in Example I. Then this agent is dissolved in ethanol in a proportion of 1:9 and it is passed at room temperature through a glass column filled with active carbon. From the obtained filtrate, after evaporation of the solvent, one obtains an agent in form of a thick yellowish oil of intensive smoked food aroma. The yield of the adsorption process amounts to 90%.

EXAMPLE IV

Tar which is the condensate of curing smoke obtained by destructive wood-distillation conducted in air excess is subjected to two-stage distillation under reduced pressure, as in Example II. The distillate obtained in the second phase after separation of the glycerol layer is subjected at room temperature to extraction with the aid of a 10% aqueous sulphuric acid solution used in a quantity of 7% by weight, the upper aqueous fraction containing organic nitric bases being rejected as waste. The lower fraction after washing with water and neutralization is the pure smoking agent.

EXAMPLE V

To a raw phenol fraction of U.S. Pat. No. 3,903,267 obtained in the smoke condensate extraction process with the aid of ethyl ether (see U.S. Pat. No. 3,903,267), aluminium dust in a quantity of 5% by weight is added and the fraction of a boiling point of 96–160° C. at a pressure of 10 mm Hg constituting the smoking agent, is distilled off. A yield of the process of about 60% is obtained. Then this agent is diluted with the aid of dialkyl ether to a 10% solution which is then passed through a glass column filled with molecular aluminosilicate sorbent at room temperature. After evaporation of the solvent, one obtains the pure smoking agent in form of a thick yellowish oil of intensive smoked food aroma. The yield of the adsorption process amounts to 90%.

EXAMPLE VI

To a raw phenol fraction obtained in the smoke condensate extraction process with the aid of ethyl ether (see U.S. Pat. No. 3,903,267), 1% of 85% orthophosphoric acid is added and after thoroughly mixing, the forerunnings at a boiling point of below 110° C. at 40 mm Hg are distilled off. To the residue, 4% of zinc dust is added and the distillation is continued. A fraction of a boiling point of 100–180° C. at 10 mm Hg in the form of a yellowish oil of intensive smoked food aroma is obtained. The yield of the process amounts to about 65%.

EXAMPLE VII

The raw phenol fraction of U.S. Pat. No. 3,903,267 as obtained in Example V, is extracted with the aid of 10% sulphuric acid used in a quantity of 25%, whereupon it is washed with an aqueous sodium chloride solution to neutral reaction, then anhydrous glycerol in a proportion of 4 parts by weight of glycerol to 1 part by weight phenol fraction is added and the distillation is effected. A fraction of a boiling point of 40–166° C. at 10 mm Hg is received. The obtained distillate, after warming to 60° C. undergoes delamination. We separate the upper layer in the form of a thick light-brown oil of an intensive smoked food aroma, being the pure phenol fraction. The yield of the whole process amounts to about 68%.

We claim:

1. A method of obtaining a smoking agent from a smoke condensate obtained from the destructive distillation of cellulosic or lignin material comprising extracting the smoke condensate with extracting amounts of aqueous solution of a mineral acid to remove organic nitric bases thereby leaving a purified condensate and then effecting a two-stage distillation of said purified condensate under reduced pressure in an inert gas atmosphere in the presence of anti-oxidative amounts of zinc dust, aluminum dust or iron dust added to said purified condensate, the first stage of the distillation being conducted at a pressure of 20–30 mm Hg to yield a residue and a fraction constituting technological waste containing substances having a boiling point below 100–110° C. at 20–30 mm Hg, the second stage of the distillation being effected on said residue from the first stage of distillation and being conducted at a pressure lower than the first stage and not exceeding 20 mm Hg in the presence of extractive distillation amounts of polyhydric alcohol added to said residue obtained from the first stage, to otain a fraction containing compounds exhibiting a boiling point of up to 250° C. at 20 mm Hg, said fraction from the second stage constituting the smoking agent in admixture with polyhydric alcohol, heating said mixture to a temperature of 50–90° C. to form an alcohol layer and a layer of smoking agent, and separating said layer of smoking agent.

2. A method as claimed in claim 1 comprising subjecting said smoking agent to selective adsorption by passing it through an adsorptive mass thereby adsorbing undesirable ballast and noxious compounds.

3. A method as claimed in claim 1 wherein the extraction of the smoke condensate is effected at room temperature, the aqueous mineral acid solution having a concentration of 5–20% and being present in an amount of 5–25% by weight of the smoke condensate.

4. A method as claimed in claim 3 comprising subjecting the smoking agent to selective adsorption by passing it through an adsorptive mass thereby adsorbing undesirable ballast and noxious compounds.

5. A method as claimed in claim 1 comprising neutralizing the fraction, which was obtained from the extraction of the smoke condensate, with water and a member selected from the group consisting of an aqueous solution of sodium bicarbonate and saturated sodium chloride solution.

6. A method as claimed in claim 5 wherein said mineral acid is orthophosphoric acid in a concentration of 85–90% and is used in a quantity of up to 5% by weight of said smoke condensate.

7. A method as claimed in claim 1 wherein the inert gas for the distillation is nitrogen, argon or carbon dioxide.

8. A method as claimed in claim 1 wherein the zinc dust, aluminum dust or iron dust is used in a quantity of 1–10% by weight of said purified condensate obtained by the extraction of the smoke condensate.

9. A method as claimed in claim 1 wherein the polyhydric alcohol is used in a quantity of 1–10 parts by weight per one part of extracted smoke condensate.

10. A method as claimed in claim 9 wherein the polyhydric alcohol is glycerol.

11. A method as claimed in claim 2 wherein the adsorptive mass is selected from the group consisting of active carbon, porous silica gel and synthetic molecular sorbents.

12. A method as claimed in claim 2 wherein prior to selective adsorption, the smoking agent is diluted with an organic solvent selected from the group comprising: lower aliphatic alcohols, aliphatic ketones, dialkyl ethers and halogenated hydrocarbons, said solvent being used in an amount up to ten times by weight that of said smoking agent.

13. A method as claimed in claim 2 wherein prior to selective adsorption the smoking agent is heated to a temperature of 50°–90° C.

14. A method of obtaining a smoking agent from a smoke condensate obtained from the destructive distillation of cellulosic or lignin material comprising effecting a two stage distillation of said smoke condensate under reduced pressure in an inert gas atmosphere in the presence of anti-oxidative amounts of zinc dust, aluminum dust or iron dust, said condensate in the first stage of the distillation being subjected to a pressure of 20–30mm Hg to yield a fraction constituting waste exhibiting a boiling point of below 110°–100° C. at a pressure of 20–30 mm Hg and a residue, said residue being subjected in the second stage of the distillation to a pressure lowered to a value that does not exceed 20 mm Hg, to obtain a fraction containing compounds having a boiling point of up to 250° at 20 mm Hg, subjecting the fraction obtained from the second stage of distillation to extraction with an aqueous solution of a mineral acid in amounts to remove organic nitric bases and obtain a remaining tarry fraction, and washing said tarry fraction of mineral acids with water to produce smoking agent.

15. A method as claimed in claim 14 wherein the extraction of the fraction obtained from the second stage of distillation is carried out at room temperature, the aqueous mineral acid solution having a concentration of 5–20%, and being present in a quantity of 5–25% by weight of the weight of smoke condensate.

16. A method as claimed in claim 14 wherein the fraction obtained from the extraction of the second stage distillate and washed with water is also washed with neutralizing amounts of aqueous solution of sodium bicarbonate or with saturated sodium chloride solution.

17. A method as claimed in claim 14 wherein said mineral acid is sulphuric acid.

18. A method as claimed in claim 14 wherein the zinc dust, aluminum dust or iron dust is used in a quanity of 1–10% by weight of the smoke condensate.

19. A method as claimed in claim 14 comprising subjecting said smoking agent to selective adsorption by passing it through an adsorptive mass for adsorbing undesirable ballast and noxious compounds.

20. A method as claimed in claim 19 wherein the adsorptive mass is selected from the group consisting of active carbon, porous silica gel and synthetic molecular sorbents.

21. A method as claimed in claim 19 wherein prior to selective adsorption the smoking agent is diluted with an organic solvent for said agent selected from the group comprising: lower aliphatic alcohols, aliphatic ketones, dialkyl ethers and halogenated hydrocarbons, said solvent being used in an amount up to ten times greater by weight than the amount of smoking agent.

22. A method as claimed in claim 19 wherein prior to selective adsorption the smoking agent is heated to a temperature of 50°–90° C.

23. A method of obtaining a smoking agent from tar obtained by condensation of smoke produced from the destructive distillation of cellulosic or lignin material in excess air, comprising subjecting the tar to extraction with an organic solvent to obtain a purified condensate fraction, containing phenols of a molecular weight above 140, subjecting the fraction to distillation under reduced pressure not higher than 20 mm Hg at a temperature of up to 200° C. in the presence of: (a) zinc dust or aluminum dust in amounts to prevent oxidation of quinones and hydroquinones; or (b) non-decomposable mineral acid in amounts to bind organic bases; or (c) a diluent selected from the group consisting of polyhydric alcohols, vegetable oils, high boiling aliphatic hydrocarbons and silicone oils, the distillation process being effected in an oxygen-free atmosphere, and collecting a smoking agent as the distillate.

24. A method as claimed in claim 23 subjecting the distillate to selective adsorption by passing it through an adsorptive mass to adsorb undesirable ballast and noxious compounds.

25. A method as claimed in claim 24 wherein the distillation of said condensate fraction is effected in the presence of orthophosphoric acid of a concentration of 85–90% as the mineral acid in a quantity of up to 5% by weight of the fraction subjected to said distillation.

26. A method as claimed in claim 24 wherein the distillation of said condensate fraction is effected with zinc dust or aluminum dust in a quantity of 1–5% by weight of the fraction subjected to distillation.

27. A method as claimed in claim 23 wherein the distillation of said condensate fraction is effected with polyhydric alcohol in a quantity of from 3 to 6 parts by weight per 1 part of the fraction subjected to the distillation.

28. A method as claimed in claim 27 wherein the polyhydric alcohol is glycerol.

29. A method as claimed in claim 23 wherein the distillation of said condensate fraction is effected in the presence of a diluent selected from the group consisting of polyhydric alcohol and vegetable oils, the distillate being subjected to extraction with extracting amount of a mineral acid, and then to neutralization.

30. A method as claimed in claim 24 wherein the adsorptive mass is selected from the group consisting of active carbon, porous silica gel and synthetic molecular sorbents.

31. A method as claimed in claim 24 wherein prior to the selective adsorption process, the distillate is diluted with an organic solvent for the distillate selected from the group comprising: lower aliphatic alcohols, aliphatic ketones, dialkyl ethers and halogenated hydrocarbons, said solvent being used in an amount up to ten times greater by weight than the amount of distillate.

32. A method as claimed in claim 24 wherein prior to the selective adsorption process the distillate is heated to a temperature of from 50–90° C.

33. A method of obtaining a smoking agent from a smoke condensate obtained from the destructive distillation of cellulosic or lignin material comprising extracting the smoke condensate with orthophosphoric acid to remove organic nitric bases therein in an inert gas atmosphere, thereby leaving a purified condensate and then effecting a two stage distillation of said purified condensate under reduced pressure in an inert gas atmosphere, the first stage of the distillation being conducted at a pressure of 20–30 mm Hg to yield a residue and a fraction constituting technological waste containing substances having a boiling point below 100–110° C. at 20–30 mm Hg, adding anti-oxidative amounts of zinc dust, aluminum dust or iron dust to said residue, the second stage of the distillation being effected on said dust containing residue from the first stage distillation and being conducted at a pressure lower than the first stage and not exceeding 20 mm Hg to obtain a fraction containing compounds exhibiting a boiling point of up to 250° C. at 20 mm Hg, and subjecting said fraction from the second stage of distillation to selective adsorption by passing it through an adsorptive mass to absorb undesirable ballast and noxious compounds and leave a purified smoking agent.

34. A method as claimed in claim 33 wherein the zinc dust, aluminum dust or iron dust is used in a quantity of 1–10% by weight of the smoke condensate.

35. A method as claimed in claim 33 wherein the adsorptive mass is selected from the group consisting of active carbon, porous silica gel and synthetic molecular sorbents.

36. A method as claimed in claim 33 wherein prior to selective adsorption the smoking agent is diluted with an organic solvent for said agent selected from the group comprising: lower aliphatic alcohols, aliphatic ketones, dialkyl ethers and halogenated hydrocarbons, said solvent being used in an amount up to ten times greater by weight than the amount of smoking agent.

37. A method as claimed in claim 33 wherein prior to selective adsorption the smoking agent is heated to a temperature of 50–90° C.

* * * * *